(12) United States Patent
Muthukumar et al.

(10) Patent No.: US 7,774,766 B2
(45) Date of Patent: *Aug. 10, 2010

(54) METHOD AND SYSTEM FOR PERFORMING REASSOCIATION IN SOFTWARE LOOPS

(75) Inventors: Kalyan Muthukumar, Bangalore (IN); Daniel M Lavery, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 1350 days.

This patent is subject to a terminal disclaimer.

(21) Appl. No.: 11/238,303

(22) Filed: Sep. 29, 2005

(65) Prior Publication Data

US 2007/0074186 A1 Mar. 29, 2007

(51) Int. Cl.
*G06F 9/45* (2006.01)
*G06F 15/00* (2006.01)

(52) U.S. Cl. .............. 717/150; 717/153; 717/159; 717/160; 717/161; 712/218; 712/233; 712/237; 712/241

(58) Field of Classification Search .............. None
See application file for complete search history.

(56) References Cited

U.S. PATENT DOCUMENTS

| | | | | |
|---|---|---|---|---|
| 5,835,776 A | * | 11/1998 | Tirumalai et al. | 717/161 |
| 5,893,073 A | * | 4/1999 | Kasso et al. | 705/8 |
| 6,507,947 B1 | * | 1/2003 | Schreiber et al. | 717/160 |
| 7,263,692 B2 | * | 8/2007 | Muthukumar et al. | 717/150 |
| 7,275,058 B2 | * | 9/2007 | Boskovic | 707/7 |
| 2002/0007484 A1 | * | 1/2002 | Tirumalai et al. | 717/9 |
| 2004/0068708 A1 | * | 4/2004 | Sivaraman et al. | 716/10 |
| 2004/0162817 A1 | * | 8/2004 | Boskovic | 707/3 |
| 2004/0163053 A1 | * | 8/2004 | Snider | 716/3 |
| 2004/0268334 A1 | * | 12/2004 | Muthukumar et al. | 717/160 |
| 2008/0028381 A1 | * | 1/2008 | Archambault et al. | 717/152 |

* cited by examiner

*Primary Examiner*—Tuan Q Dam
*Assistant Examiner*—Isaac T Tecklu
(74) *Attorney, Agent, or Firm*—Blakely, Sokoloff, Taylor & Zafman LLP (57) ABSTRACT

Various embodiments of the present invention relate to methods and systems for optimizing an intermediate code in a compilation logic. The intermediate code is optimized by performing reassociation in software loops. The intermediate code includes at least one critical recurrence cycle. The performance of reassociation in software loops can reduce a critical recurrence cycle in them, which can speed up their execution. The subject method can include the determination of one or more critical recurrence cycles in a software loop. The method can also include the determination of at least one edge in a critical recurrence cycle, with respect to which reassociation can be performed, if one or more pre-determined criteria are met. The method can further include performing reassociation of a dependee and a dependent of an edge. In an embodiment, when one or more pre-determined criteria are met, the logic of the software loop is maintained after performing reassociation of the dependee and the dependent of the edge. Consequently, the number of cycles in a critical recurrence cycle of the software loop is reduced. The execution time of the software loop is also decreased.

23 Claims, 9 Drawing Sheets

FIG. 1

```
Loop:
         add       v15=v3, v0                      // (1)
         add       v10=v11, v15                    // (2)
         ld1       v12=[v10]                       // (3)
         cmp4eq    V46, V47=v12, V12               // (4)
         depi      v52=0, v0, 15, 49
         shladd    v53=v52, 1, V14
 (V47)   ld2       V0= [v53]                       // (5)
 (V47)   cmp4leuU  V48, V49=V0, V8             204
         addi      V1= -1, V1
 (V49)   cmp4ne    V45, p0=V1, r0
 (V45)   br        Loop
                                                   202
```

```
Loop:
        add       v151=v3, v0
        add       v15=v3, v11        // (1a)
        add       v10=v0, v15        // (1)
        ld1       v12=[v10]          // (2)
        cmp4eq    v46, v47=v12, v12  // (3)
        depi      v52=0, v0, 15, 49
        shladd    v53=v52, 1, v14    // (4)
(V47)   ld2       v0= [v53]          // (5)
(V47)   cmp4leuU  V48, V49=V0, V8
(V49)   addi      V1= -1, V1
(V45)   cmp4ne    V45, p0=V1, r0
        br        Loop
Loop_exit:
        Mov       V15=V151
```

METHOD AND SYSTEM FOR PERFORMING REASSOCIATION IN SOFTWARE LOOPS

BACKGROUND

Embodiments of the present invention relate to the field of computer systems. In particular, embodiments of the present invention relate to a method, system, and computer program product for reducing the time taken to execute instructions in a software loop.

A compiler is a program that reads a source code (in a source language) and translates it into a target code (in a machine language). The compiler, while forming the target code, formulates an intermediate code (in a machine-independent form). For example, a compiler for FORTRAN translates a high-level source code in the FORTRAN programming language into a target code in machine language, which can be executed by a computer processor. In addition, the compiler for FORTRAN, while forming the target code, formulates an intermediate code. Machine-independent optimizations may be carried out on the intermediate code.

Conventional compilers include three stages—a front end, a middle end, and a back end. The front end translates the source code into the intermediate code. The middle end optimizes the intermediate code, using machine independent optimizations. The back end generates the target code, which is optimized by using machine-dependent optimizations.

Optimizing the intermediate code refers to the transformation of the intermediate code into an alternate functionally equivalent code that has reduced execution time. The time taken to execute the source code depends on a number of factors. These factors include the number of instructions required to execute the source code, the average number of processor cycles required to execute an instruction, and the cycle time of the processor.

Various methods have been used to optimize intermediate codes in the machine-independent form in the compiler. These methods facilitate the reduction of the height of the instructions in a basic block of a software loop. The basic block is a straight-line piece of code without any jumps in the middle of the block.

Software loops are usually the places where the bulk of the execution time is spent in a program. Therefore, speeding up the execution of these loops can save execution time. Some loops are resource-bound, i.e., they are bound by the number of issue and instructions slots available for their instructions. However, many other loops are recurrence-bound, i.e., they are limited in performance by the availability of results from an earlier iteration. Traditionally, reassociation is used to reduce the height of a computation, i.e., it is used to re-order the computation in a basic block, so that a given instruction can be executed faster than before. Such techniques, while they are useful for speeding up computation in acyclic regions, may not always speed up the execution of loops. What is important in speeding up recurrence-bound loops is to reduce their critical recurrence cycles, and not so much to reduce their heights in the basic blocks.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

DESCRIPTION OF VARIOUS EMBODIMENTS

Various embodiments of the present invention relate to methods and systems for optimizing an intermediate code in a machine-independent form in compilation logic. The intermediate code is optimized by performing reassociation in software loops. The intermediate code includes at least one critical recurrence cycle. Performing reassociation in software loops can reduce a critical recurrence cycle in them, which can speed up their execution. The subject method can include determining one or more critical recurrence cycles in a software loop. The method can also include determination of at least one edge in a critical recurrence cycle, with respect to which reassociation can be performed, if one or more pre-determined criteria are met. The method can further include performing reassociation of a dependee and a dependent of an edge. In an embodiment, when one or more pre-determined criteria are met, the logic of the software loop is maintained after performing reassociation of the dependee and the dependent of the edge. As a result, the number of cycles in a critical recurrence cycle of the software loop is reduced. The execution time of the software loop is also reduced.

Figure 1:
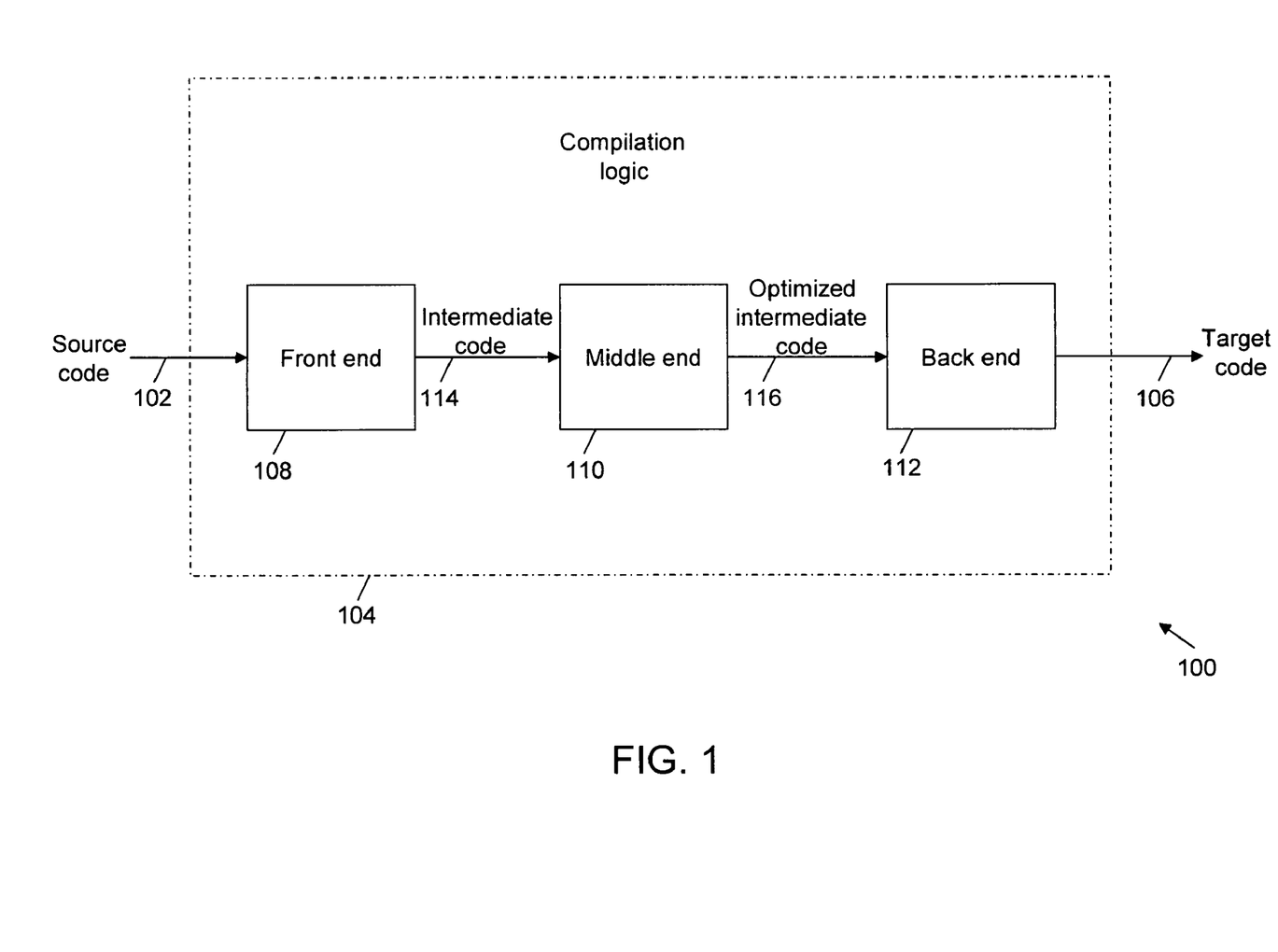
FIG. 1 is a block diagram illustrating an operational environment for various embodiments of the present invention.

FIG. 1 is a block diagram illustrating an operational environment 100, for various embodiments of the present invention. Environment 100 includes a source code 102, a compilation logic 104, and a target code 106. Compilation logic 104 reads source code 102 in a source language and translates it into target code 106. Target code 106 is a code in a machine language. The machine language is in a binary form, i.e., in terms of '1' and '0'. An example of compilation logic 104 is a compiler. Examples of the source language include FORTRAN, BASIC, JAVA, and C.

Compilation logic 104 includes a front end 108, a middle end 110, and a back end 112. Front end 108 receives source code 102 as an input and performs lexical analysis, syntax analysis, and semantic analysis. Further, front end 108 translates source code 102 to an intermediate code 114. Middle end 110 receives intermediate code 114 as an input and translates intermediate code 114 to an optimized intermediate code 116. Middle end 110 provides intermediate code optimization in a machine independent form. Back end 112 receives optimized intermediate code 116 and performs compiler analysis and optimization of intermediate code 114 in a machine-dependent form. Subsequently, back end 112 translates optimized intermediate code 116 to target code 106.

Intermediate code 114 includes at least one software loop. In a software loop, a set of instructions is executed iteratively until the termination condition is achieved. The software loop is successively iterated during the execution of target code 106. The number of cycles between the beginning of the successive iterations of the software loop is known as the Initiation Interval (II). The II of the software loop is the larger of resource II and recurrence II. The resource II depends on the number of instructions the computer processor can execute in one cycle and the computer processor cycle time. The recurrence II is based on the cycles in the dependence graph of the software loop and the latencies of the processor.

The cycle in the software loop, which has recurrence II that is greater than resource II, is known as a critical recurrence cycle. The critical recurrence cycle includes a plurality of instructions, so that the execution of instructions in one iteration is dependent on the results of instructions in a previous iteration. For example, a software loop that includes five instructions may have a critical recurrence cycle (1)→(2)→(3)→(4)→(5)→(1). Here, the output of instruction (1) is an input to instruction (2), the output of instruction (2) is an input to instruction (3), and so forth. In various embodiments of the present invention, a recurrence-bound software loop is optimized by reducing the number of cycles in the critical recurrence cycle.

Figure 2:
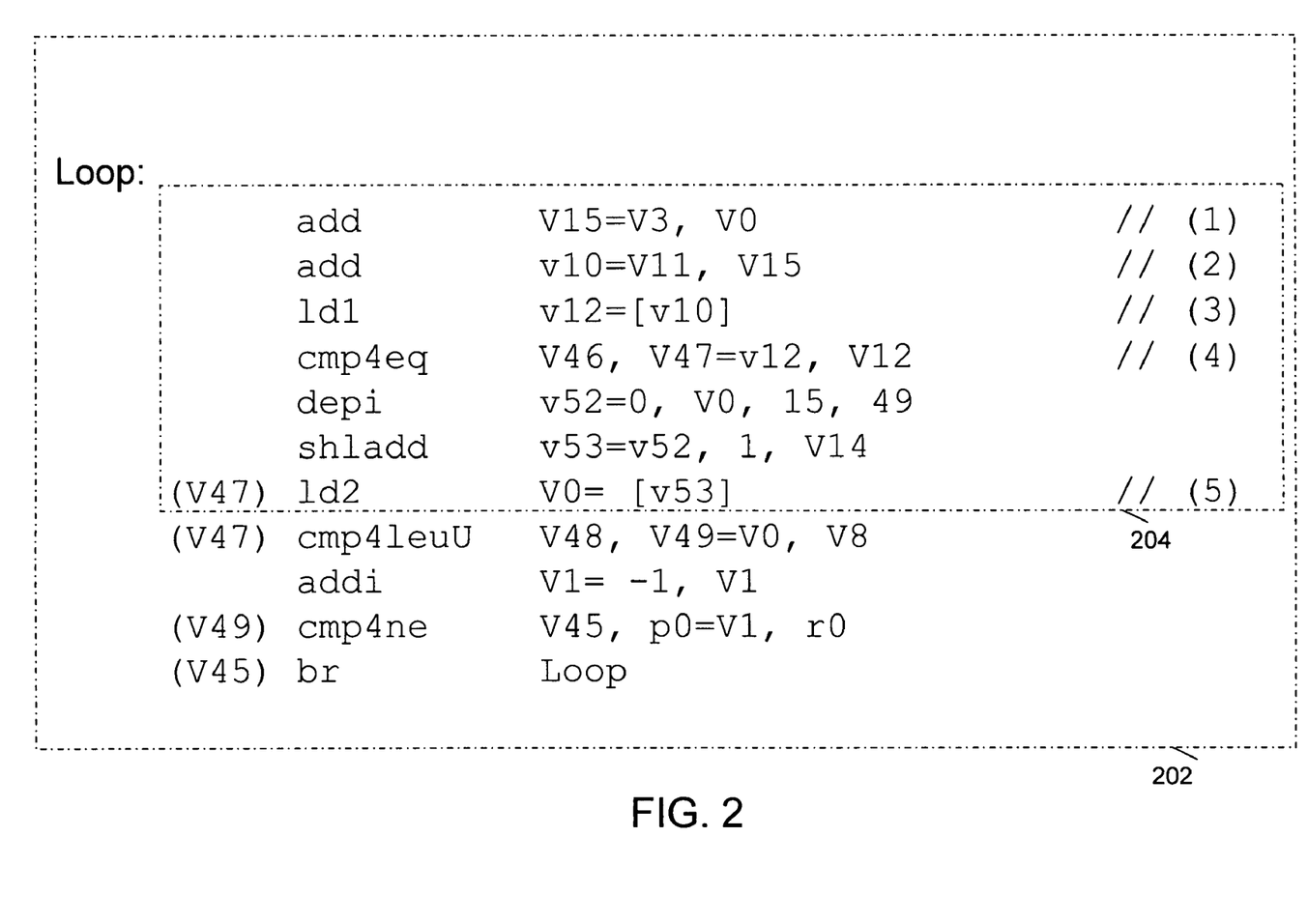
FIG. 2 illustrates a specific software loop.

FIG. 2 shows a specific software loop 202. Software loop 202 includes five instructions, i.e., (1), (2), (3), (4), and (5). Software loop 202 includes a critical recurrence cycle 204. Critical recurrence cycle 204 is (1)→(2)→(3)→(4)→(5)→(1) with a recurrence II of five cycles. In software loop 202, V15, V3, V0, V11, V12, V14, V1, v10, v12, v52, and v53 are virtual general-purpose registers, and V46, V47, V48, V49, and V45 are virtual predicate registers. The virtual general-purpose registers store data and addresses. The virtual predicate registers V46, V47, V48, V49, and V45 store one-bit values of '0' and '1'. The one-bit value '0' is equivalent to false and the one-bit value '1' is equivalent to true. In various embodiments of the invention, a virtual general-purpose register and a virtual predicate register may function as a read operand.

Various embodiments of the present invention perform reassociation in software loop 202, to reduce the number of cycles in critical recurrence cycle 204.

Figure 3:
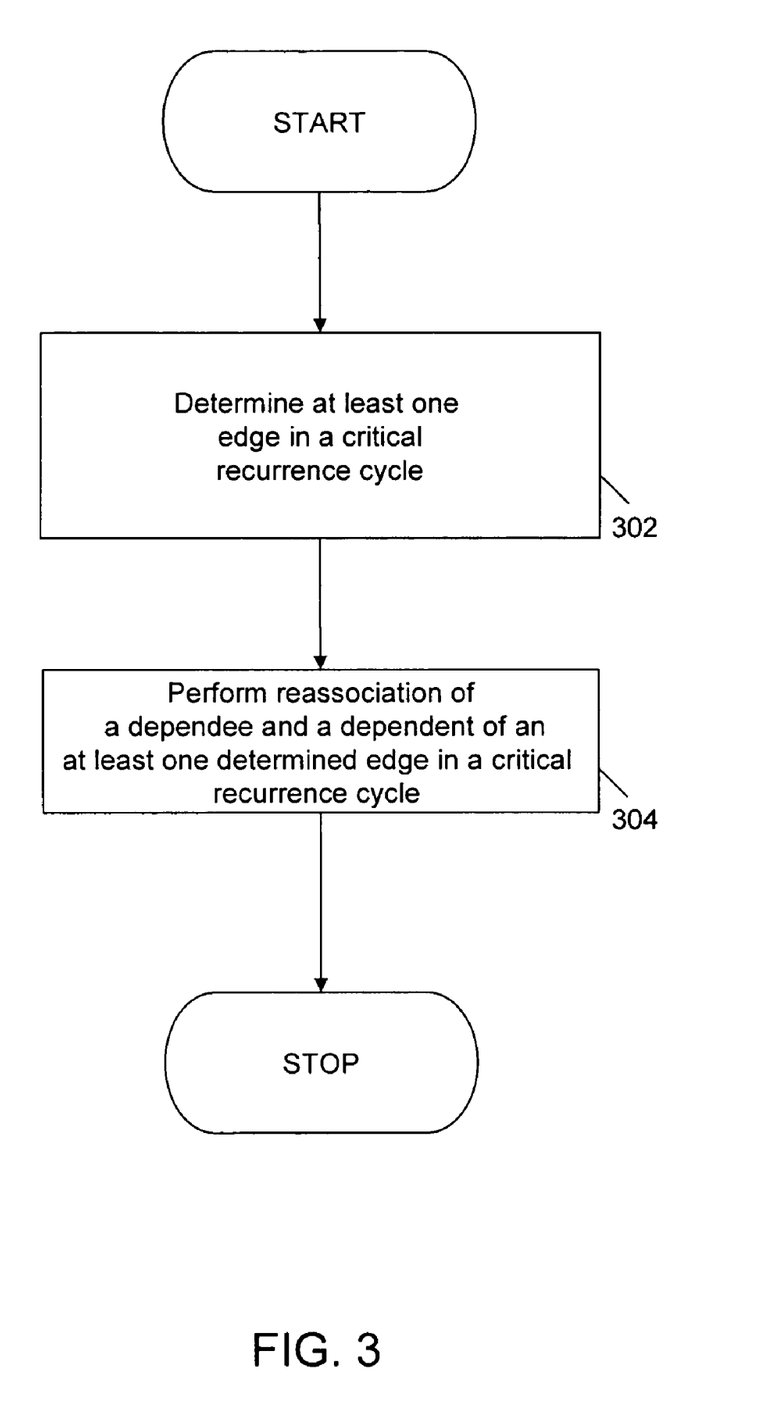
FIG. 3 illustrates a flowchart of a method for optimizing the execution of a software loop, in accordance with an embodiment of the present invention.

FIG. 3 illustrates a flowchart of a method for optimizing the execution of software loop 202, in accordance with an embodiment of the present invention. At 302, at least one edge is determined in a critical recurrence cycle. The edge is a dependency link between two instructions and includes a dependee and a dependent. The dependee is an instruction, which produces a result, and the dependent is an instruction, which uses the result. For example, referring to FIG. 2, in an edge (1)→(2), instruction (1) is a dependee and instruction (2) is a dependent. The determination of an edge is further explained in conjunction with FIGS. 4A, 4B, and 4C.

Further, at 304, reassociation is performed in a dependee and a dependent in at least one determined edge in a critical recurrence cycle. The reassociation of the dependee and the dependent of the edge is further explained in conjunction with FIG. 5.

Figure 4A:
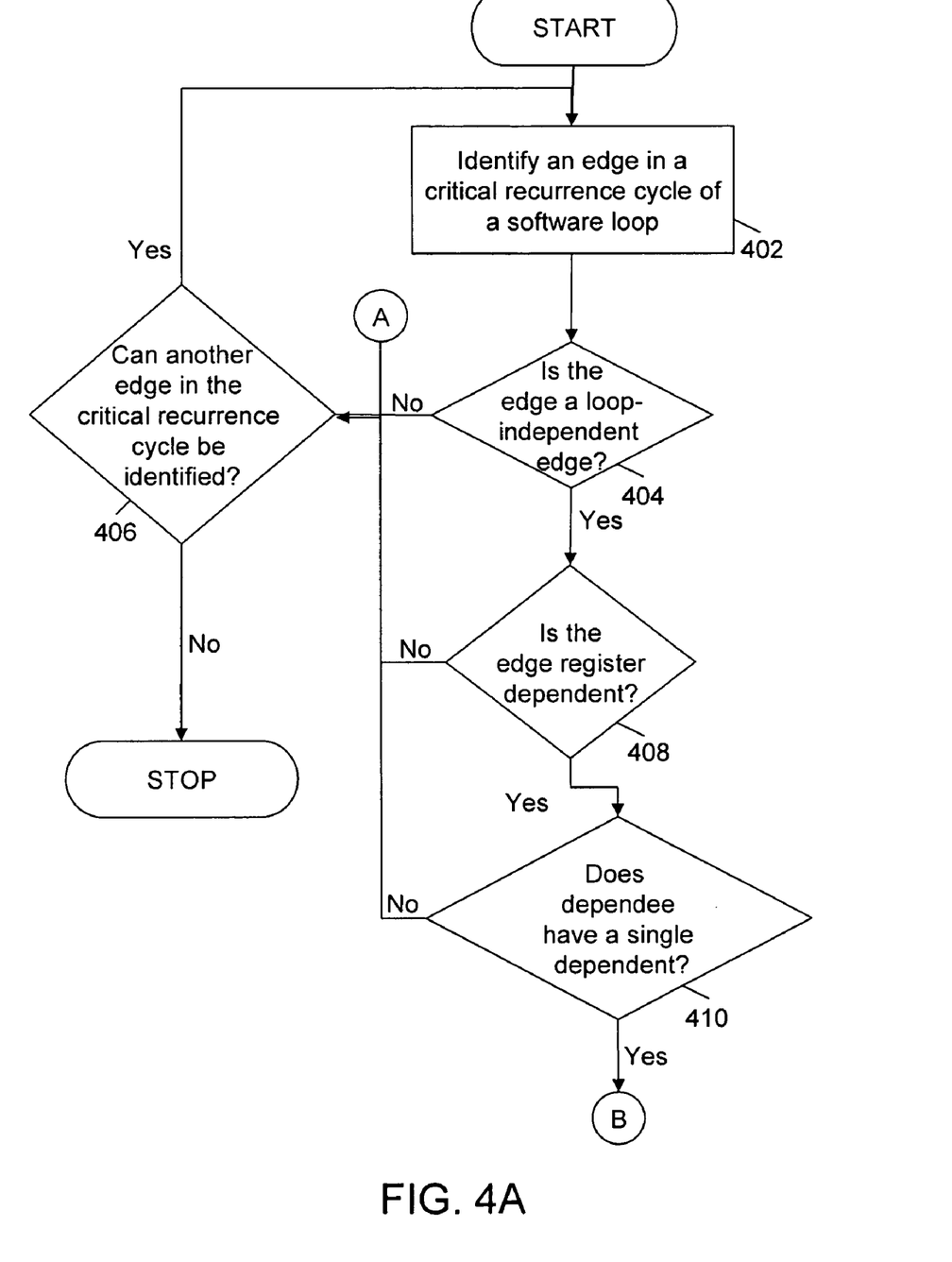
FIGS. 4A, 4B, and 4C illustrate a flowchart for optimizing the execution of a software loop, in accordance with another embodiment of the present invention.
Figure 4B:
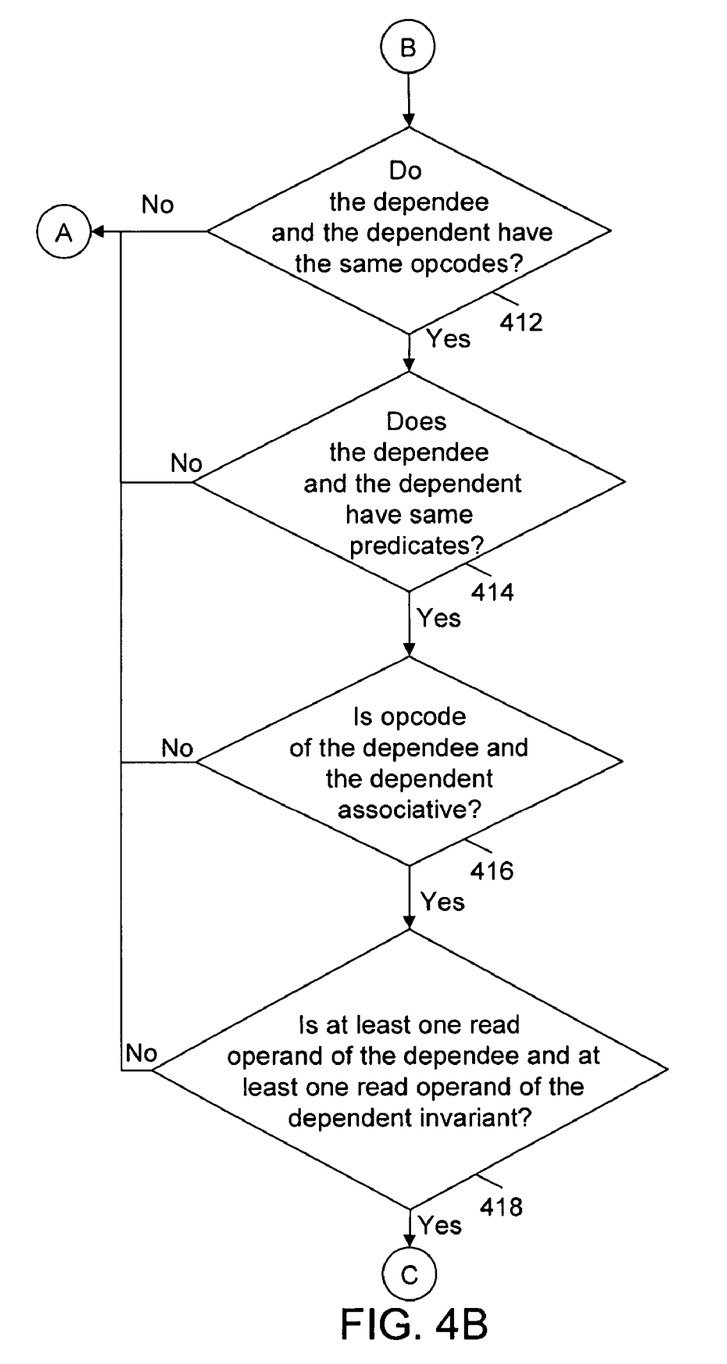
Figure 4C:
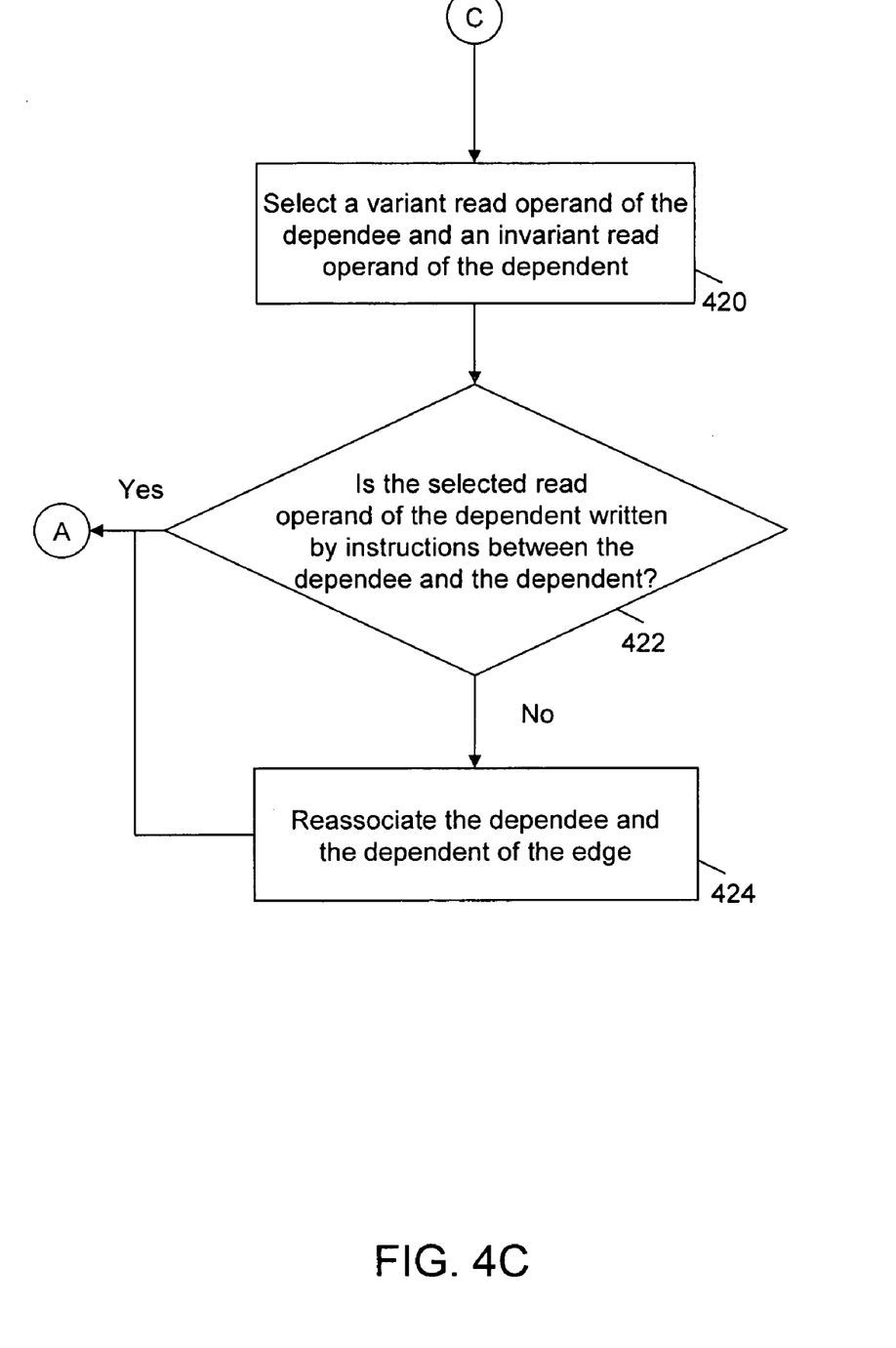

FIGS. 4A, 4B, and 4C illustrate a flowchart for optimizing the execution of software loop 202, in accordance with another embodiment of the present invention. At 402, an edge is identified in a critical recurrence cycle. At 404, it is determined whether the edge is a loop-independent edge. In a loop-independent edge, the execution of the dependee and the dependent is carried out in the same iteration of the software loop. For example, referring to FIG. 2, in critical recurrence cycle 204, edges (1)→(2), (2)→(3), (3)→(4), (4)→(5) are loop-independent edges. Further, edge (5)→(1) is a loop-carried edge. In a loop-carried edge, the execution of the dependee and the dependent is carried out in different iterations of the software loop. Hence, edge (5)→(1) is a loop-carried edge, since the dependee (5) and the dependent (1) are executed in different iterations of software loop 202.

If the edge is a loop-carried edge (i.e., not a loop-independent edge), then the dependee and the dependent of the edge are not reassociated and control proceeds to 406. If it is determined at 406 that another edge in the critical recurrence cycle can be identified, then control proceeds to 402. In an embodiment, if it is determined at 406 that another edge in the critical recurrence cycle cannot be identified, then the method, explained in conjunction with FIGS. 4A, 4B and 4C, can be performed with respect to other critical recurrence cycles in the software loop.

However, if the edge is a loop-independent edge then 408 is performed. At 408, it is determined whether the edge is a register dependent edge. In a register-dependent edge, the result of the dependee, which is an input to the dependent, is stored in a register. For example, referring to FIG. 2, in edge (1)→(2), in critical recurrence cycle 204, dependee (1) computes a value that is stored in virtual general-purpose register V15, and dependent (2) uses the value stored in virtual general purpose register V15. Therefore, edge (1)→(2) is a register-dependent edge. If the edge is not register-dependent, then the dependee and the dependent of the edge are not reassociated and control proceeds to 406.

However, if the edge is register dependent then 410 is performed. At 410, it is determined whether the dependee has a single dependent. The dependee has a single dependent if the dependee computes a value that is used only by a single dependent. For example, referring to FIG. 2, in critical recurrence cycle 204, the instructions (1), (2), and (3) have single dependents. If the dependee has multiple dependents, then the dependee and the dependent of the edge are not reassociated and control proceeds to 406.

However, if the edge has a single dependent, then 412 is performed. At 412, it is determined whether the dependee and the dependent of the edge have the same opcodes. If the dependee and the dependent have the same opcodes, then they have the same operation, e.g., addition, multiplication or subtraction. For example, referring to FIG. 2, in critical recurrence cycle 204, in edge (1)→(2), the dependee (1) and the dependent (2) have the same opcode, i.e., 'add'. Further, edges (2)→(3), (3)→(4), (4)→(5), (5)→(1) have different opcodes. If the opcodes of the dependee and the dependent are different, then the dependee and the dependent of the edge are not reassociated and control proceeds to 406.

However, if the dependee and the dependent have the same opcodes, then 414 is performed. At 414, it is determined whether the dependee and the dependent have the same predicates. If the dependee and the dependent are not predicated, then it is assumed that they have the same predicates. Predicates are registers that are used to store the results of conditional instructions. If the condition in the instruction is true, then the predicate register has the value '1'; otherwise, it has the value '0'. For example, referring to FIG. 2, in critical recurrence cycle 204, in edges (1)→(2), (2)→(3), (3)→(4), the dependees and dependents have the same predicates. The dependee and the dependent having a predicate is only reassociated if the predicate is the same for both. If the predicates of the dependee and the dependent are different, then the dependee and the dependent of the edge are not reassociated, and control proceeds to 406.

However, if the dependee and the dependent have the same predicates, then 416 is performed. At 416, it is determined whether the opcode of the dependee and the dependent is associative. An associative operation, *, is an operation in which $(a*b)*c=a*(b*c)$. Examples of associative opcodes include add the opcode and the multiply opcode, which correspond to the operations of addition and multiplication, respectively. For example, referring to FIG. 2, in edge (1)→(2), in critical recurrence cycle 204, the opcode 'add' of dependee (1) and dependent (2) is associative. Further, edges (2)→(3), (3)→(4), (4)→(5), (5)→(1) do not have associative opcodes. If the opcodes of the dependee and the dependent of the edge are not associative, then the dependee and the dependent of the edge are not reassociated, and control proceeds to 406.

However, if the opcodes of the dependee and the dependent are associative, then 418 is performed. At 418, it is determined whether at least one read operand of the dependee is invariant and at least one read operand of the dependent is invariant in the critical recurrence cycle. A read operand is referred to as an invariant if it is not written by an instruction in the critical recurrence cycle. The read operand is referred to as a variant if the read operand is written by an instruction in the critical recurrence cycle. For example, referring to FIG. 2, in edge (1)→(2) in critical recurrence cycle 204, dependee (1) has read operand V3 that is invariant. Further, dependent (2) has read operand V11 that is invariant.

If each read operand of the dependee is a variant, or each read operand of the dependent is a variant, then the dependee and the dependent of the edge are not reassociated, and control proceeds to 406.

However, if at least one read operand of the dependee is invariant, and at least one read operand of the dependent is invariant, in the critical recurrence cycle, then 420 is performed. At 420, a variant read operand of the dependee and an invariant read operand of the dependent is selected. For example, referring to FIG. 2, in edge (1)→(2), in critical recurrence cycle 204, the read operand V0 of the dependee (1) can be selected. This is because V0 is written by instruction (5) in critical recurrence cycle 204. Further, the read operand V11 of the dependent (2) can be selected. This is because V11 is not written by the instructions in critical recurrence cycle 204.

At 422, it is determined whether the selected read operand of the dependent is not written by the instructions between the dependee and the dependent. This is verified, since the dependee and the dependent may not be consecutive instructions in the software loop. For example, referring to FIG. 2, in edge (1)→(2), in critical recurrence cycle 204, the selected read operand of the dependent V11 is not written by instructions between dependee (1) and dependent (2). This is because dependee (1) and dependent (2) are consecutive instructions.

If the value of the read operand of the dependent is written by instructions between the dependee and the dependent, then the dependee and the dependent of the edge are not reassociated, and control proceeds to 406.

However, if the value of the selected read operand of the dependent is not written by instructions between the dependee and the dependent, then 424 is performed. At 424, the dependee and the dependent of the edge are reassociated. Reassociation is performed by swapping the selected variant read operand of the dependee with the selected invariant read operand of the dependent. For example, referring to FIG. 2, in edge (1)→(2) in critical recurrence cycle 204, dependee (1) and dependent (2) can be reassociated. In edge (1)→(2), dependee (1) and dependent (2) can be reassociated by swapping the selected variant read operand V0 of dependee (1) with the selected invariant read operand V11 of dependent (2). This is further explained in conjunction with FIG. 5. After reassociating the dependee and the dependent of the edge, control proceeds to 406.

In various embodiments of the present invention, each instruction that is the dependee of the edge in a critical recurrence cycle in the software loop has a corresponding a Boolean register linked to it. The Boolean register is set as 'false' before reassociation is performed. When the instructions in an edge are reassociated at 424 then the Boolean register for the dependee is set as 'true'. Further, only those edges whose dependees have their Boolean registers set as 'false' are identified at 402. As a result, an edge that is identified at 402 is not identified again.

In an embodiment of the present invention, reassociation is not performed if the result of the dependee of the edge is stored in a floating point register. In various embodiments, the programmer may have the option of deciding whether reassociation can be performed for floating-point computation. This option may be provided, for example, by a command-line argument. A command-line argument is a method of interacting with a computer by giving lines of textual commands into the computer. In an embodiment, the user can set a switch to, for example, '1', if reassociation is allowed, even if the result of the dependee is a floating point register; and '0' if the reassociation is not allowed, if the result of the dependee is a floating point register.

Figure 5:
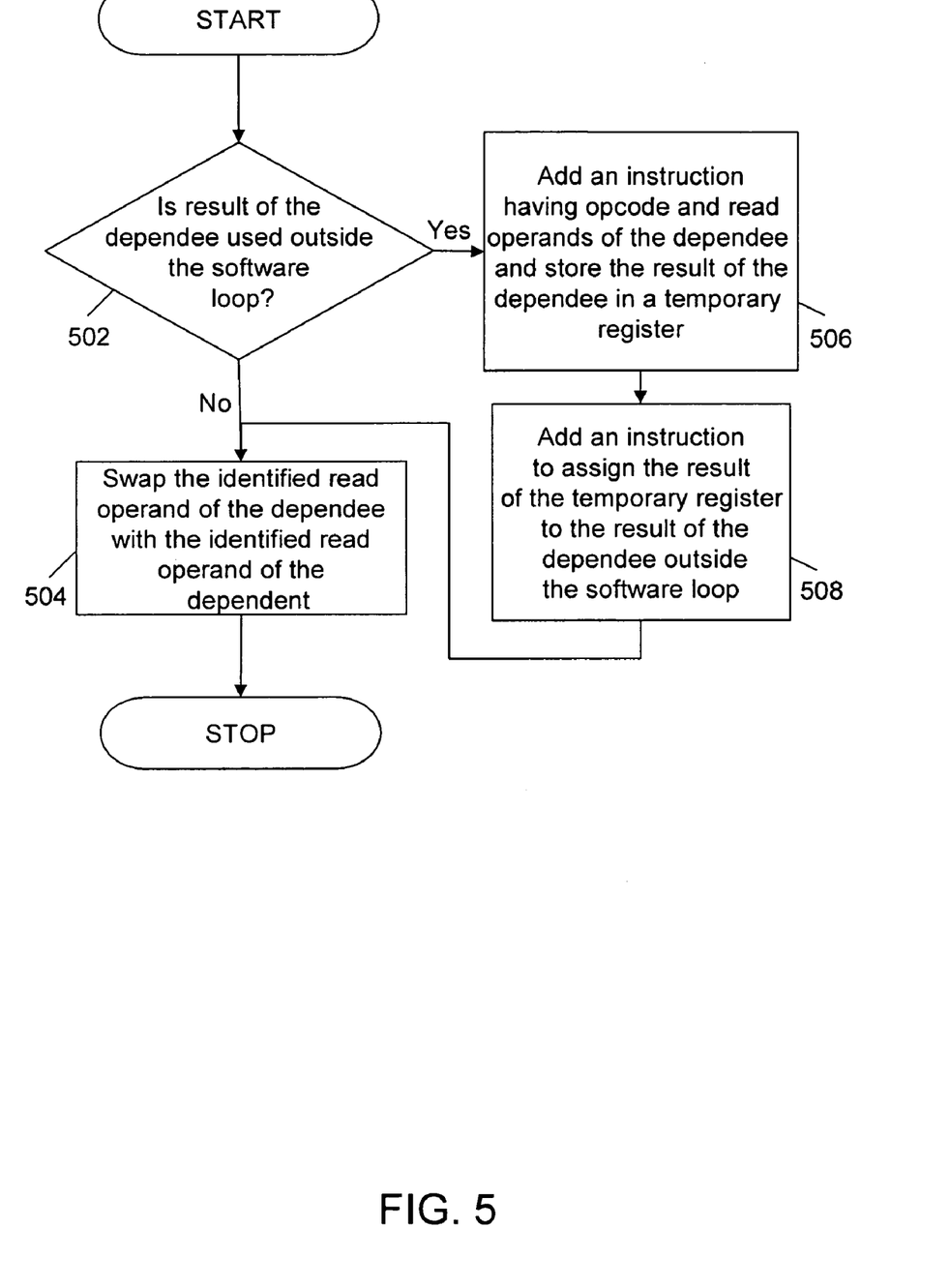
FIG. 5 illustrates a flowchart for performing reassociation of a software loop, in accordance with an embodiment of the present invention.

FIG. 5 illustrates a flowchart for performing reassociation in software loop 202, in accordance with an embodiment of the present invention. At 502, it is determined whether the result of the dependee is live outside the software loop. The result of the dependee is referred to as being live outside the software loop, if the result of the dependee is used outside the software loop. If the result of the dependee is not live outside the software loop, then 504 is performed. At 504, the selected variant read operand of the dependee is swapped with the selected invariant read operand of the dependent. For example, referring to FIG. 2, dependee (1) and dependent (2) are reassociated by swapping the selected variant read operand of dependee (1) with the selected read operand of dependent (2). As a result, V0 is swapped with V11, so that the addition operations accomplished through dependee (1) and dependent (2) are reassociated.

However, if the result of the dependee is live outside the software loop then 506 is performed. At 506, a first additional instruction having the same opcode and read operands of the dependee is added, prior to the dependee. Further, the result of the dependee is stored in a temporary register. Thereafter, at 508, a second additional instruction is added, to assign the result of the temporary register to the result of the dependee outside the software loop, and control proceeds to 504.

In a specific embodiment of the present invention, the methods explained in conjunction with FIGS. 4A, 4B, and 4C and FIG. 5 can be implemented by the following pseudo code:

---

Compute all the critical recurrence cycles in the software loop;
Written_vregs = list of all the virtual registers that are written by instructions that are in a critical recurrence cycle;
For each edge in all critical recurrence cycles, mark Reassociated (dependee (edge)) =

-continued

```
False;
// For example, dependee (A → B) = A, and dependent (A → B) = B.
For each critical recurrence cycle C in the loop {
    For each edge E in critical recurrence cycle C {
        If (Reassociated (dependee (E))) {continue ;}
        If (Loop_carried (E)) {continue ;}
        If (E is not caused by a register dependence) {continue ;}
        If (dependee (E) has multiple loop-independent dependents) {continue ;}
        If (dependee (E) and dependent (E) have different opcodes) {continue ;}
        If (dependee (E) and dependent (E) have different predicates) {continue ;}
        If (dependee (E) and dependent (E) instructions are not associative) {continue ;}
        If (all the read operands of either the dependee (E) or dependent (E) occur in the
list "Written_vregs") {continue ;}
// Now, compute the read operands of the dependee and the dependent that can be
swapped, thus resulting in
        // reassociation. The swap_vreg of dependee (E) occurs in the list "Written_vregs",
while the swap_vreg of dependent (E) does not.
        Compute swap_vreg (dependee (E)) and swap_vreg (dependent (E));
        If (dependee (E) and dependent (E) are not consecutive AND swap_vreg
(dependent (E)) is defined in between the two) {continue ;}
        If (FP reassociation is not allowed AND if the result of dependee (E) is an FP
register) {continue ;}
        If (the result of dependee (E) is live-out) {
            Create Dee' = clone of dependee (E);
            Let V be the result virtual register of dependee (E);
            Create a new virtual register V' and make it the result of Dee';
            Add a new instruction "MOV V = V' " in the software loop exit(s);
        }
        Swap swap_vreg (dependee (E)) and swap_vreg (dependent (E));
        Reassociated (dependee (E)) = True;
    } End For each edge E;
} End For each critical recurrence cycle;
```

Figure 6:
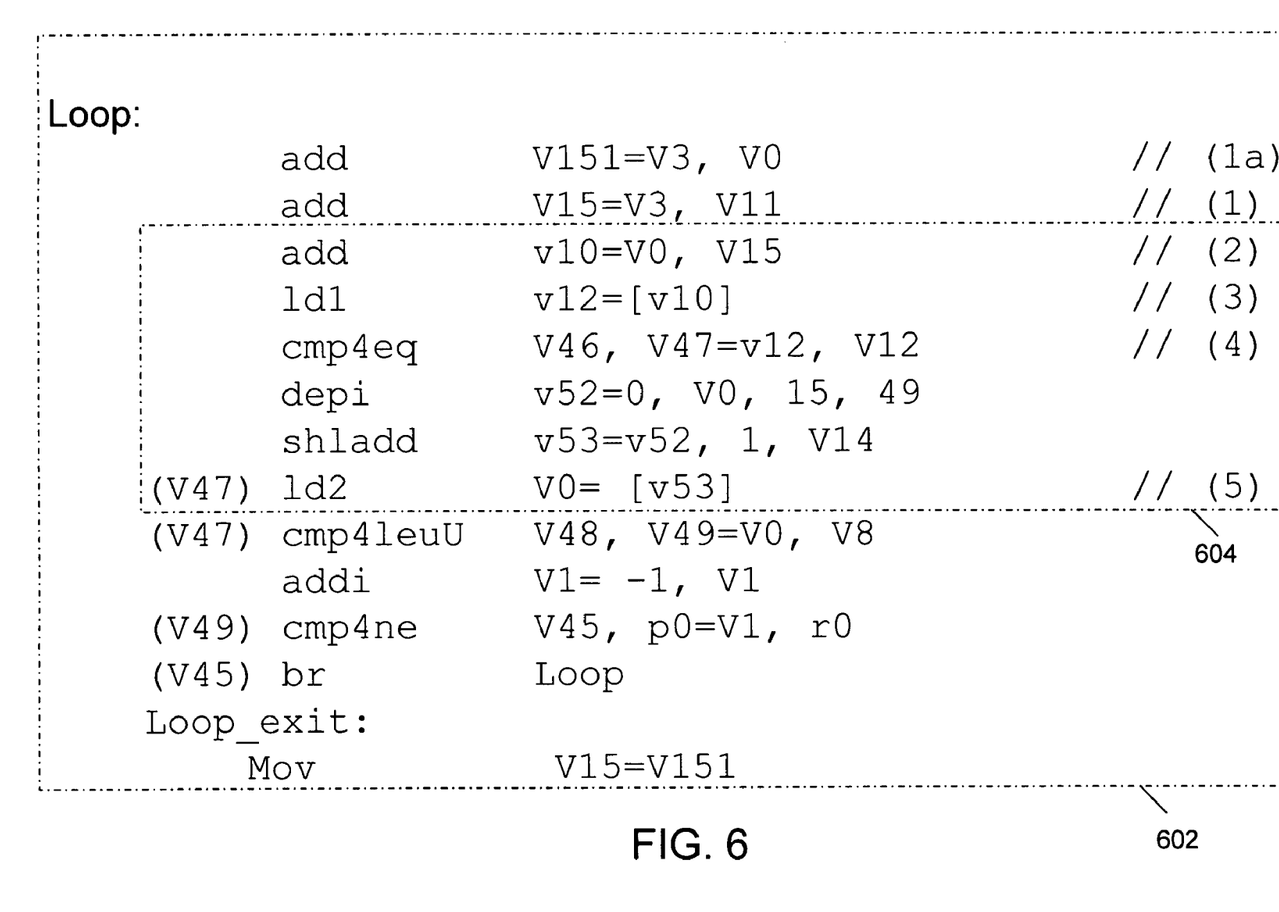
FIG. 6 illustrates a reassociated software loop, in accordance with a specific embodiment of the present invention.

FIG. 6 illustrates a reassociated software loop 602, in accordance with a specific embodiment of the present invention. In an embodiment, reassociated software loop 602 represents intermediate compilation logic instructions that use virtual registers after optimization and before instruction scheduling.

Reassociated software loop 602 includes an instruction (1a). In addition, instruction (1) and instruction (2) have been modified, so as to perform reassociation of the addition operations accomplished in instructions (1) and (2) of software loop 202. Instruction (1a) is added to software loop 202 as the value of V3+V0, written by instruction (1) of software loop 202, which is live outside software loop 202. Dependee (1) and dependent (2) of edge (1)→(2) have been reassociated. In particular, where instructions (1) and (2) of software loop 202 accomplish (V3+V0)+V11), the modified instructions (1) and (2) of reassociated software loop 602 accomplish (V3+V11)+V0, which re-orders the sequence of the addition of V3, V0, and V11. The re-ordered addition sequence is equivalent because the addition is an associative operand. As observed from reassociated software loop 602, instruction (1) is not dependent on any value from a previous iteration. However, instruction (2) is dependent on a value from a previous iteration.

Further, reassociated software loop 602, includes instruction MOV V15=V151. This is because it is assumed that the result of dependee (1) in software loop 202 V15 is live outside software loop 202. Consequently, the result of the temporary register V151 is assigned to V15 outside reassociated software loop 602.

As a result of reassociating dependee (1) and dependent (2) of edge (1)→(2), a critical recurrence cycle 604 ((2)→(3)→(4)→(5)→(2)) is formed. Reassociated software loop 602 requires four cycles per iteration, providing a 20 percent gain over the static performance of software loop 202.

Reassociated software loop 602 can be translated into target code 106 by back end 112. Target code 106, can be executed in machine language by a computer processor such as a microprocessor.

Figure 7:
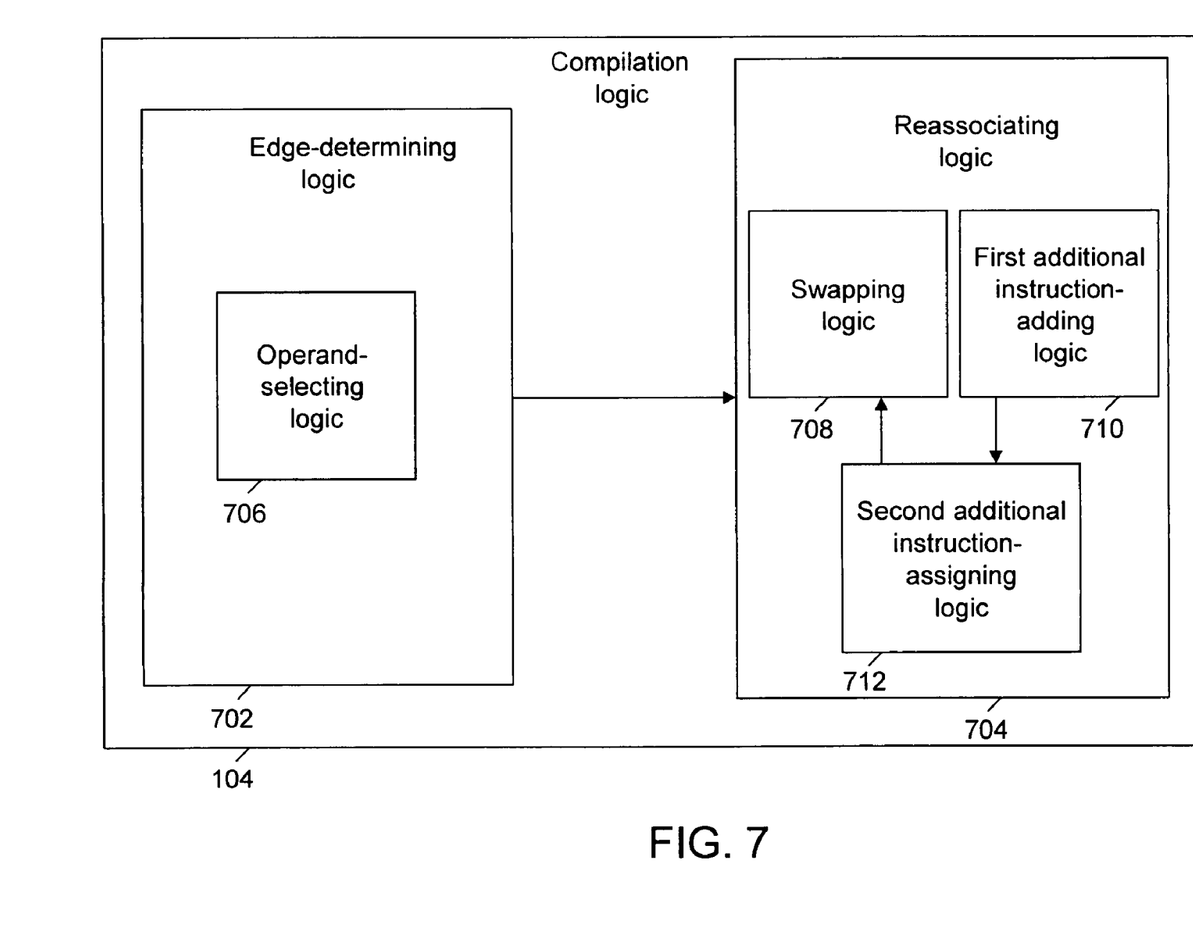
FIG. 7 is a block diagram illustrating a compilation logic, in accordance with an embodiment of the present invention.

FIG. 7 is a block diagram illustrating compilation logic 104, in accordance with an embodiment of the present invention. Compilation logic 104 includes an edge-determining logic 702 and a reassociating logic 704. Edge-determining logic 702 selects a dependee and dependent of an edge that can be reassociated if one or more pre-determined criteria are met. The pre-determined criteria have been explained in conjunction with FIGS. 4A, 4B and 4C. Edge-determining logic 702 includes an operand-selecting logic 706, which selects a variant read operand of a dependee and an invariant read operand of the dependent that can be swapped.

Reassociating logic 704 performs reassociation of the dependee and the dependent of the edge, determined by edge-determining logic 702. Reassociating logic 704 includes a swapping logic 708, a first additional instruction-adding logic 710, and a second additional instruction-assigning logic 712.

Swapping logic 708 swaps the selected variant read operand of the dependee with the invariant read operand of the dependent. First additional instruction-adding logic 710 adds a first additional instruction having the opcode and the read operands of the dependee. In addition, the result of the instruction, with the opcode and read operands of the dependee, is stored in a temporary register. Second additional instruction-assigning logic 712 adds second additional instruction outside the software loop, to assign the result of the temporary register to the register, to hold the result of the dependee.

In an embodiment of the present invention, edge-determining logic 702, reassociating logic 704, operand-selecting logic 706, swapping logic 708, first additional instruction-adding logic 710, and second additional instruction-assigning logic 712 can be present in middle end 110 of compilation logic 104.

The various embodiments of the present invention provide methods and systems optimizing an intermediate code. Optimization of the intermediate code is carried out by reducing the number of cycles in the critical recurrence cycle of the software loop. As a result, the execution time of instructions in the software loop is reduced. This results in better performance of a compilation logic. Further, the various embodiments of the present invention provide methods and systems that perform reassociation of instructions in recurrence-bound loops, to speed up their performance.

The various embodiments of the present invention provide methods and systems that can be implemented on software loops with zero or more critical recurrence cycles. Further, the critical recurrence cycles may be unrolled, software-pipelined and circular-scheduled. The various embodiments of the present invention also provide methods and systems that can be implemented on compiler architectures such as in-order and out-of-order. Further, the various embodiments of the present invention provide methods and systems that can be implemented before other recurrence-reduction techniques such as riffling.

It will be apparent to one skilled in the art that the methods, according to various embodiments of the invention, may be embodied in a computer program product.

The various embodiments of the invention provide methods and systems that can be implemented on software loops with at least one critical recurrence cycle. Further, the critical recurrence cycles may be unrolled, software-pipelined and circular-scheduled. The various embodiments of the invention also provide methods and systems that can be implemented on compiler architectures such as in-order and out-of-order. Further, the various embodiments of the invention provide methods and systems that can be implemented before other recurrence reduction techniques such as riffling have been applied.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system includes a computer, an input device, a display unit, and the Internet. The computer can incorporate a microprocessor, which can be connected to a communication bus. The computer can also include a memory, which may include Random Access Memory (RAM) and/or Read Only Memory (ROM). The computer system can further incorporate a storage device, which may include a hard disk drive or a removable storage drive such as a floppy disk drive and/or an optical disk drive. The storage device can also be other similar device for loading computer programs or other instructions into the computer system.

The computer system executes a set of instructions that are stored in one or more storage elements, in order to process input data. The storage elements may also hold data or other information, as required. The storage element may be in the form of an information source or a physical memory element in the processing machine.

The set of instructions may include various commands that instruct the processing machine to perform specific tasks, such as the steps that constitute the method of the present invention. The set of instructions may be in the form of a software program. The software may be in various forms, such as system software or application software. Further, the software may be in the form of a collection of separate programs, a program module with a larger program, or a portion of a program module. The software may also include modular programming in the form of object-oriented programming. The processing of input data by the processing machine may be in response to users' commands, to results of previous processing, or to a request made by another processing machine.

The term, 'logic', may include, by way of example, software or hardware and/or combinations of software and hardware.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method comprising:
receiving a source code having a critical recurrence cycle in a software loop;
determining, prior to executing the source code on a processor, at least one edge in the critical recurrence cycle of the software loop, each edge comprising a dependee and a dependent;
determining if a result of the dependee is live outside the critical recurrence cycle of the software loop;
adding a first additional instruction in the software loop prior to the dependee if the result of the dependee is live outside the critical recurrence cycle of the software loop, the first additional instruction having a read operand of the dependee;
performing reassociation of the dependee and the dependent of the at least one determined edge in the critical recurrence cycle of the software loop to form a reassociated software loop, the performing by swapping the read operand of the dependee with a read operand of the dependent;
translating the reassociated software loop to a target code; and
executing the target code by the processor.

2. The method of claim 1, wherein the method is embodied in a compilation logic, and wherein the result of the first additional instruction being stored in a temporary register, the method further comprising:
adding a second additional instruction outside the critical recurrence cycle of the software loop to assign the result of the temporary register to the result of the dependee.

3. The method of claim 1, wherein the edge being a loop-independent edge, wherein the edge is a loop-independent edge if the dependee and the dependent are executed in same iteration of the software loop.

4. The method of claim 1, wherein the dependee and the dependent having a register dependency.

5. The method of claim 1, wherein the dependee having only one dependent.

6. The method of claim 1, wherein the dependee and the dependent having same opcodes.

7. The method of claim 1, wherein the dependee and the dependent having the same predicates.

8. The method of claim 6, wherein the opcode of the dependee and the opcode of the dependent being associative.

9. The method of claim 1, wherein the result of the dependee being stored in a non-floating point register.

10. The method of claim 1, wherein the read operand of the dependee is a variant read operand and wherein the read operand of the dependent is an invariant read operand in the critical recurrence cycle of the software loop.

11. The method of claim 1, wherein determining at least one edge comprises selecting at least one read operand of the dependee and at least one read operand of the dependent.

12. The method of claim 11, wherein the selected read operand of the dependee is variant in the critical recurrence cycle.

13. The method of claim 11, wherein the selected read operand of the dependent is invariant in the critical recurrence cycle.

14. The method of claim 11, wherein the selected read operand of the dependent is not written by instructions between the dependee and the dependent.

15. The method of claim 11, wherein performing reassociation of at least one edge of the dependee and the dependent by swapping the read operand of the dependee with a read operand of the dependent comprises swapping the selected read operand of the dependee with the selected read operand of the dependent.

16. A system comprising:
a processor having an edge-determining logic and a reassociating logic; and
a memory, coupled with the processor, the memory having instructions to be executed by the processor, the instructions when executed by the processor cause the processor to perform a method, the method comprising:
determining by the edge-determining logic at least one edge in a critical recurrence cycle of a software loop, each edge comprising a dependee and a dependent;
determining if a result of the dependee is live outside the critical recurrence cycle of the software loop;
adding a first additional instruction in the software loop prior to the dependee if the result of the dependee is live outside the critical recurrence cycle of the software loop, the first additional instruction having a read operand of the dependee; and
performing reassociation, by the reassociating logic, of the dependee and the dependent of the at least one determined edge in the critical recurrence cycle of the software loop to form a reassociated software loop, the performing by swapping the read operand of the dependee with a read operand of the dependent.

17. The system of claim 16, wherein the edge-determining logic comprises an operand-selecting logic to select the read operand of the dependee and the read operand of the dependent, wherein the read operand of the dependee is a variant read operand, and wherein the read operand of the dependent is an invariant read operand.

18. The system of claim 17, wherein the reassociating logic comprises a swapping logic to swap the selected read operand of the dependee with the selected read operand of the dependent.

19. The system of claim 18, wherein the reassociating logic further comprises:

a first additional instruction-adding logic to add the first additional instruction;
a temporary register to store the result of the determining of the dependee being live outside the critical recurrence cycle of the software loop; and
a second additional instruction-assigning logic to add a second additional instruction outside the software loop to assign the result of the temporary register to the result of the dependee.

20. A computer program product for use with a computer, the computer program product comprising a computer storage medium having a computer readable program code embodied therein, the computer readable program code when executed on the computer performs a method, the method comprising:
receiving a source code having a critical recurrence cycle in a software loop;
determining, prior to executing the source code on a processor of the computer, at least one edge in the critical recurrence cycle of the software loop, each edge comprising a dependee and a dependent;
determining if a result of the dependee is live outside the critical recurrence cycle of the software loop;
adding a first additional instruction in the software loop prior to the dependee if the result of the dependee is live outside the critical recurrence cycle of the software loop, the first additional instruction having a read operand of the dependee;
performing reassociation of at least one of the dependee and the dependent of the at least one determined edge in the critical recurrence cycle of the software loop to form a reassociated software loop, the performing by swapping the read operand of the dependee with a read operand of the dependent;
translating the reassociated software loop to a target code; and
executing the target code by the processor.

21. The computer program product of claim 20, wherein the computer program code performing determining at least one edge comprises a computer program code performing selecting the read operand of the dependee and the read operand of the dependent, wherein the read operand of the dependee is a variant read operand, and wherein the read operand of the dependent is an invariant read operand.

22. The computer program product of claim 21, wherein the computer program code performing reassociating of the dependee and the dependent of the edge comprises a computer program code performing swapping the selected read operand of the dependee with the selected read operand of the dependent.

23. The computer program product of claim 20,
wherein the result of the first additional instruction being stored in a temporary register, the method further comprising:
adding a second additional instruction outside the critical recurrence cycle of the software loop to assign the result of the temporary register to the result of the dependee.

* * * * *